US008867616B2

(12) United States Patent
Luo et al.

(10) Patent No.: US 8,867,616 B2
(45) Date of Patent: *Oct. 21, 2014

(54) METHODS AND APPARATUS FOR BIT DEPTH SCALABLE VIDEO ENCODING AND DECODING UTILIZING TONE MAPPING AND INVERSE TONE MAPPING

(75) Inventors: Jiancong Luo, West Windsor, NJ (US); Zhan Ma, Plano, TX (US); Peng Yin, Ithaca, NY (US)

(73) Assignee: Thomson Licensing, Issy les Moulineaux (FR)

( * ) Notice: Subject to any disclaimer, the term of this patent is extended or adjusted under 35 U.S.C. 154(b) by 387 days.

This patent is subject to a terminal disclaimer.

(21) Appl. No.: 13/138,407

(22) PCT Filed: Feb. 9, 2010

(86) PCT No.: PCT/US2010/000356
§ 371 (c)(1),
(2), (4) Date: Aug. 11, 2011

(87) PCT Pub. No.: WO2010/093432
PCT Pub. Date: Aug. 19, 2010

(65) Prior Publication Data
US 2011/0293003 A1 Dec. 1, 2011

Related U.S. Application Data

(60) Provisional application No. 61/151,569, filed on Feb. 11, 2009.

(51) Int. Cl.
*H04N 7/12* (2006.01)
*H04N 19/46* (2014.01)
(Continued)

(52) U.S. Cl.
CPC *H04N 19/00321* (2013.01); *G06T 2207/10016* (2013.01); *H04N 19/00545* (2013.01);
(Continued)

(58) Field of Classification Search
CPC ............ G06T 5/20; G06T 5/40; G06T 5/001;
G06T 5/009; G06T 2207/10016; H04N 19/00024; H04N 19/00321; H04N 19/00545; H04N 19/0089; H04N 19/00903; H04N 19/00757; H04N 19/00424; H04N 19/00309; H04N 19/00133; H04N 19/00218; H04N 19/00278; H04N 19/00
USPC .................. 375/240, 240.13, 240.16, 240.29; 382/238, 246, 251; 348/701
See application file for complete search history.

(56) References Cited

U.S. PATENT DOCUMENTS 5,909,249 A * 6/1999 Sathe et al. .............. 375/240.18
2006/0133472 A1 6/2006 Bruls et al.
(Continued)

FOREIGN PATENT DOCUMENTS

CN 1666531 A 9/2005
WO WO 2007/082562 7/2007
(Continued)

OTHER PUBLICATIONS

Schwarz, H. et al., "Constrained Inter-Layer Prediction for Single-Loop Decoding in Spatial Scalability", IEEE 2005, Fraunhofer Institute for Telecommunications—Heinrich Hertz Institute, Berlin, Germany [hschwarz,hinz,marpe,wiegand]@hhi.fraunhofer.de.
(Continued)

*Primary Examiner* — Gims Philippe
*Assistant Examiner* — Samuel D Fereja
(74) *Attorney, Agent, or Firm* — Robert D. Shedd; Ronald J. Kolczynski

(57) ABSTRACT

Methods and apparatus are provided for bit depth scalable video encoding and decoding utilizing tone mapping and inverse tone mapping. An apparatus includes an encoder for encoding picture data for at least a portion of a picture by generating an inter-layer residue prediction for the portion using a tone mapping function and an inverse tone mapping function. The tone mapping function and the inverse tone mapping function perform a conversion of the inter-layer residue prediction from a residue domain to a pixel domain for bit depth scalability while maintaining a same bit depth representation.

29 Claims, 5 Drawing Sheets

(51) Int. Cl.

| | | |
|---|---|---|
| *G06T 5/40* | (2006.01) | |
| *H04N 19/187* | (2014.01) | |
| *G06T 5/00* | (2006.01) | |
| *H04N 19/30* | (2014.01) | |
| *H04N 19/105* | (2014.01) | |
| *H04N 19/85* | (2014.01) | |
| *H04N 19/80* | (2014.01) | |
| *H04N 19/59* | (2014.01) | |

(52) U.S. Cl.
CPC . *G06T 5/40* (2013.01); *G06T 5/009* (2013.01); *H04N 19/00424* (2013.01); *H04N 19/00024* (2013.01); *H04N 19/00903* (2013.01); *H04N 19/0089* (2013.01); *H04N 19/00757* (2013.01)
USPC .................................. 375/240.12; 375/240.16

(56) References Cited

U.S. PATENT DOCUMENTS

| | | | |
|---|---|---|---|
| 2007/0065023 A1* | 3/2007 | Lee et al. | 382/232 |
| 2007/0201560 A1* | 8/2007 | Segall et al. | 375/240.24 |
| 2008/0075166 A1* | 3/2008 | Gish et al. | 375/240.13 |
| 2009/0003457 A1* | 1/2009 | Liu et al. | 375/240.25 |
| 2009/0097561 A1* | 4/2009 | Chiu et al. | 375/240.16 |
| 2009/0238279 A1* | 9/2009 | Tu et al. | 375/240.16 |
| 2010/0220796 A1* | 9/2010 | Yin et al. | 375/240.29 |
| 2013/0051472 A1* | 2/2013 | Wiegand et al. | 375/240.16 |

FOREIGN PATENT DOCUMENTS

| | | |
|---|---|---|
| WO | WO 2008/019524 | 2/2008 |
| WO | WO 2009/003499 | 1/2009 |
| WO | WO 2009/051690 | 4/2009 |
| WO | WO 2009/051692 | 4/2009 |

OTHER PUBLICATIONS

Wu, Y. et al., "Bit-Depth Scalability Compatible to H.264/AVC-Scalable Extension", Journal of Visual Communication and Image Representation, Academic Press, Inc., US LNKD-DOI:10.1016/J.JVCIR.2008.06.003, vol. 19, No. 6, Aug. 1, 2008, pp. 372-381, XP023903328.

Segall, A. et al., Joint Video Team (JVT) of ISO/IEC MPEG & ITU-T VCEG (ISO/IEC JTC1/SC29/WG11 and ITU-T SG16 Q.6) $20^{th}$ Meeting: Klagenfurt, Austria, Jul. 17-21, 2006, JVT-T060, "Tone Mapping SEI Message".

Gao, Y. et al., Joint Video Team (JVT) of ISO/IEC MPEG & ITU-T VCEG (ISO/IEC JTC1/SC29/WG11 and ITU-T SG16 Q.6) $21^{st}$ Meeting: Hangzhou, China, Oct. 20-27, 2006, JVT-U049, "Applications and Requirement for Color Bit Depth Scalability".

Gao, Y. et al., Joint Video Team (JVT) of ISO/IEC MPEG & ITU-T VCEG (ISO/IEC JTC1/SC29/WG11 and ITU-T SG16 Q.6) $24^{th}$ Meeting: Geneva, CH, Jun. 29-Jul. 5, 2007, JVT-X051, Simulation Results for CE2: SVC Bit-depth Scalability.

Wu, Y. et al., Joint Video Team (JVT) of ISO/IEC MPEG & ITU-T VCEG (ISO/IEC JTC1/SC29/WG11 and ITU-T SG16 Q.6) $24^{th}$ Meeting: Geneva, CH, Jun. 29-Jul. 5, 2007, JVT-X052, "Study on Inter-layer Prediction in Bit-Depth Scalability".

Winken, M. et al., Joint Video Team (JVT) of ISO/IEC MPEG & ITU-T VCEG (ISO/IEC JTC1/SC29/WG11 and ITU-T SG16 Q.6) $24^{th}$ Meeting: Geneva, CH, Jun. 29-Jul. 5, 2007, JVT-X057, "CE2: VC Bit-Depth Scalable Coding".

Segall, A. et al., Joint Video Team (JVT) of ISO/IEC MPEG & ITU-T VCEG (ISO/IEC JTC1/SC29/WG11 and ITU-T SG16 Q.6) $24^{TH}$ Meeting: Geneva, Switzerland, Jun. 29-Jul. 5, 2007, JVT-X067, "CE2: Inter-layer Prediction for Bit-Depth Scalable Coding".

Wiegand, T. et al., Joint Video Team (JVT) of ISO/IEC MPEG & ITU-T VCEG (ISO/IEC JTC1/SC29/WG11 and ITU-T SG16 Q.6) $21^{st}$ Meeting: Hangzhou, China, Oct. 20-27, 2006, JVT-U201, "Joint Draft 8 of SVC Amendment".

\* cited by examiner

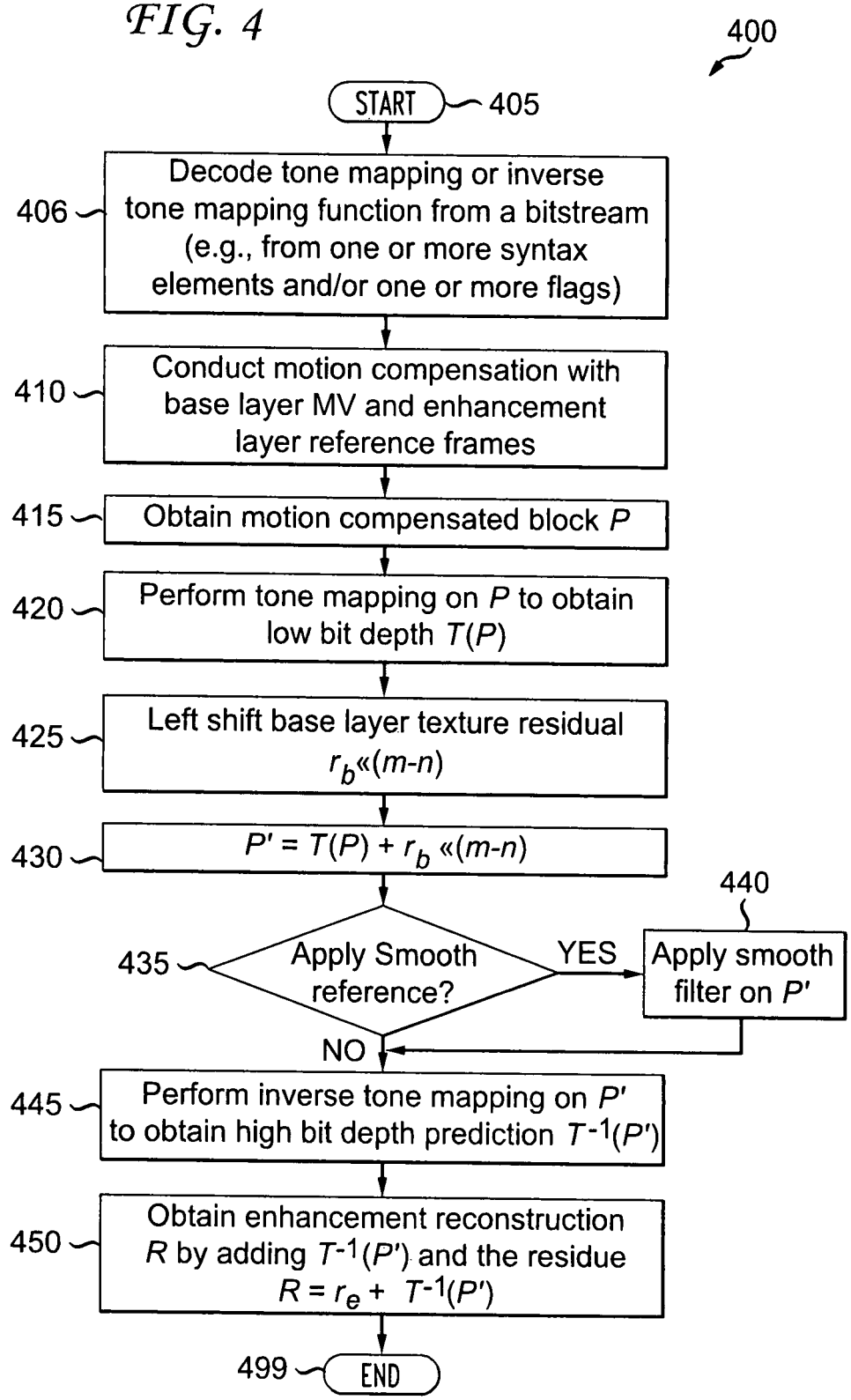

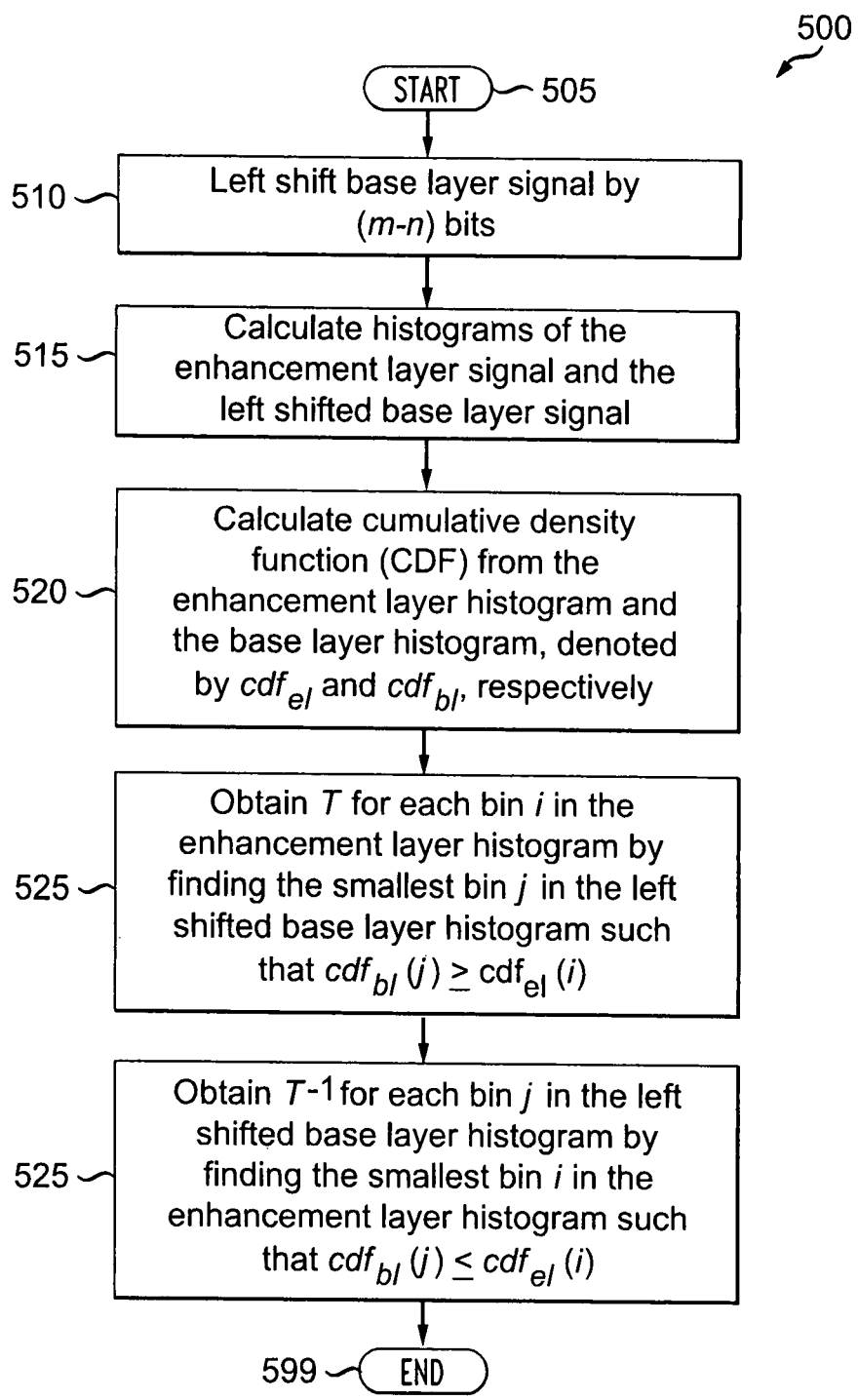

METHODS AND APPARATUS FOR BIT DEPTH SCALABLE VIDEO ENCODING AND DECODING UTILIZING TONE MAPPING AND INVERSE TONE MAPPING

CROSS-REFERENCE TO RELATED APPLICATIONS

This application claims the benefit, under 35 U.S.C. §365 of International Application PCT/US2010/000356 and filed Feb. 9, 2010, which was published in accordance with PCT Article 21(2) on Aug. 19, 2010, in English, and which claims the benefit of U.S. Provisional Application Ser. No. 61/151, 569, filed Feb. 11, 2009, in English which is incorporated by reference in their respective entireties.

TECHNICAL FIELD

The present principles relate generally to video encoding and decoding and, more particularly, to methods and apparatus for bit depth scalable video encoding and decoding utilizing tone mapping and inverse tone mapping.

BACKGROUND

Recently, digital images/videos with a bit depth greater than eight are increasingly desirable in many application fields such as, for example, medical image processing, digital cinema workflows in production and postproduction, home theater related applications, and so forth. Bit depth scalability is potentially useful considering the fact that at some time in the future, conventional eight bit depth and high bit depth digital imaging systems will simultaneously exist. There are several ways to handle the coexistence of an 8-bit video and a 10-bit video. In a first prior solution, only a 10-bit coded bit-stream is transmitted and the 8-bit representation for standard 8-bit display devices is obtained by applying tone mapping methods to the 10-bit presentation. In a second prior art solution, a simulcast bit-stream is transmitted that includes an 8-bit coded presentation and 10-bit coded presentation. It is the preference of the decoder to choose which bit depth to decode. For example, a 10-bit capable decoder can decode and output a 10-bit video while a normal decoder supporting only 8-bits can just output an 8-bit video. The first prior art solution is inherently incompliant with the 8-bit profiles of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard"). The second prior art solution is compliant to all the current standards but requires more overhead. However, a good tradeoff between the bit reduction and backward standard compatibility can be a scalable solution. Scalable video coding (SVC), which is also known as a scalable extension of the MEG-4 AVC Standard, is considering the support of bit depth scalability. There are at least three advantages of bit depth scalable coding over post-processing or simulcast. One advantage is that bit depth scalable coding enables 10-bit video in a backward-compatible manner with the High Profiles of the MPEG-4 AVC Standard. A second advantage is that bit depth scalable coding enables adaptation to different network bandwidths or device capabilities. A third advantage is that bit depth scalable coding provides low complexity, high efficiency and high flexibility.

MPEG-4 AVC SVC Extension

In the current version of the SVC extension of the MPEG-4 AVC Standard, single-loop decoding is supported to reduce decoding complexity. The complete decoding, including motion-compensated prediction and deblocking, of the inter-coded macroblocks is only required for the current spatial or coarse-grain scalability (CGS) layer. This is realized by constraining the inter-layer intra texture prediction to those parts of the lower layer picture that are coded with intra macroblocks. To extend inter-layer intra texture prediction for bit depth scalability, inverse tone mapping is used. SVC also supports inter-layer residue prediction. Since tone mapping is typically used in the pixel domain, it is very hard to find a corresponding inverse tone mapping in the residue domain. In third and fourth prior art approaches, bit shift is used for inter-layer residue prediction.

In the 'joint draft 8 (JD8) of the scalable video coding (SVC) extension of the MPEG-4 AVC Standard, hereinafter also referred to as the third prior art approach, a technique referred to as smooth reference prediction (SRP) is proposed. A one-bit syntax element smoothed_reference_flag is sent when the syntax elements residual_prediction_flag and base_mode_flag are both set. When smoothed_reference_flag=1, the following steps are taken at the decoder to obtain the reconstructed video block:

1. The prediction block P is obtained using the enhancement layer reference frames and up-sampled motion vectors from the base layer.
2. The corresponding base layer residual block $r_b$ is up-sampled and $U(r_b)$ is added to P to form $P+U(r_b)$.
3. A smoothing filter with tap [1,2,1] is applied, first in the horizontal direction and then in the vertical direction, to obtain $S(P+U(r_b))$.
4. The enhancement layer residual block is added to the result of immediately preceding step (3) to obtain the reconstruction block $R=S(P+U(r_b))+r_e$.

Further, a fourth prior art approach proposes techniques for inter-layer residue prediction for BDS (Bit Depth Scalability). The fourth prior art approach converts the inverse tone mapping problem from the residue domain to the pixel domain for inter-layer residue prediction. If inter-layer residue prediction is used, then inverse tone mapping is applied to the sum of the tone mapped motion compensated prediction and the up-sampled residue from the base layer. When inter-layer residue prediction is used, the following steps are taken at the decoder to obtain the reconstructed video block:

1. The prediction block P is obtained using the enhancement layer reference frames and then P is tone mapped into the base layer bit depth to obtain T(P).
2. The corresponding base layer residual block $r_b$ is spatially up-sampled and $U(r_b)$ is added to P to form $T(P)+U(r_b)$.
3. A filter is used to obtain $S(T(P)+U(r_b))$.
4. Inverse tone mapping is then applied to obtain $T^{-1}(S(T(P)+U(r_b)))$.
5. The enhancement layer residual block is added to the result of immediately preceding step (4) to obtain the reconstruction block $R=T^{-1}(S(T(P)+U(r_b)))+r_e$.

Using this approach, the prediction block P is tone-mapped into the base layer bit depth and is then inversed tone mapped back to the enhancement layer bit depth. Since the base layer has a lower bit depth, this conversion will introduced quantization error.

Thus, all of the preceding prior art solutions are deficient. For example, the third prior art approach cannot handle different bit depths in the enhancement and base layers, due to the lack of tone mapping and inverse tone mapping operations. Moreover, the fourth prior art approach introduces quantization error.

SUMMARY

These and other drawbacks and disadvantages of the prior art are addressed by the present principles, which are directed to methods and apparatus for bit depth scalable video encoding and decoding utilizing tone mapping and inverse tone mapping.

According to an aspect of the present principles, there is provided an apparatus. The apparatus includes an encoder for encoding picture data for at least a portion of a picture by generating an inter-layer residue prediction for the portion using a tone mapping function and an inverse tone mapping function. The tone mapping function and the inverse tone mapping function perform a conversion of the inter-layer residue prediction from a residue domain to a pixel domain for bit depth scalability while maintaining a same bit depth representation.

According to another aspect of the present principles, there is provided a method. The method includes encoding picture data for at least a portion of a picture by generating an inter-layer residue prediction for the portion using a tone mapping function and an inverse tone mapping function. The tone mapping function and the inverse tone mapping function perform a conversion of the inter-layer residue prediction from a residue domain to a pixel domain for bit depth scalability while maintaining a same bit depth representation.

According to yet another aspect of the present principles, there is provided an apparatus. The apparatus includes a decoder for decoding picture data for at least a portion of a picture by generating an inter-layer residue prediction for the portion using a tone mapping function and an inverse tone mapping function. The tone mapping function and the inverse tone mapping function perform a conversion of the inter-layer residue prediction from a residue domain to a pixel domain for bit depth scalability while maintaining a same bit depth representation.

According to a further aspect of the present principles, there is provided a method. The method includes decoding picture data for at least a portion of a picture by generating an inter-layer residue prediction for the portion using a tone mapping function and an inverse tone mapping function. The tone mapping function and the inverse tone mapping function perform a conversion of the inter-layer residue prediction from a residue domain to a pixel domain for bit depth scalability while maintaining a same bit depth representation.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 4 is a flow diagram showing an exemplary method for inter-layer residue prediction for bit depth scalability in a video decoder, in accordance with an embodiment of the present principles; and FIG. 5 is a flow diagram showing an exemplary for creating a tone mapping function and an inverse tone mapping function, in accordance with an embodiment of the present principles.

DETAILED DESCRIPTION

Figure 1:
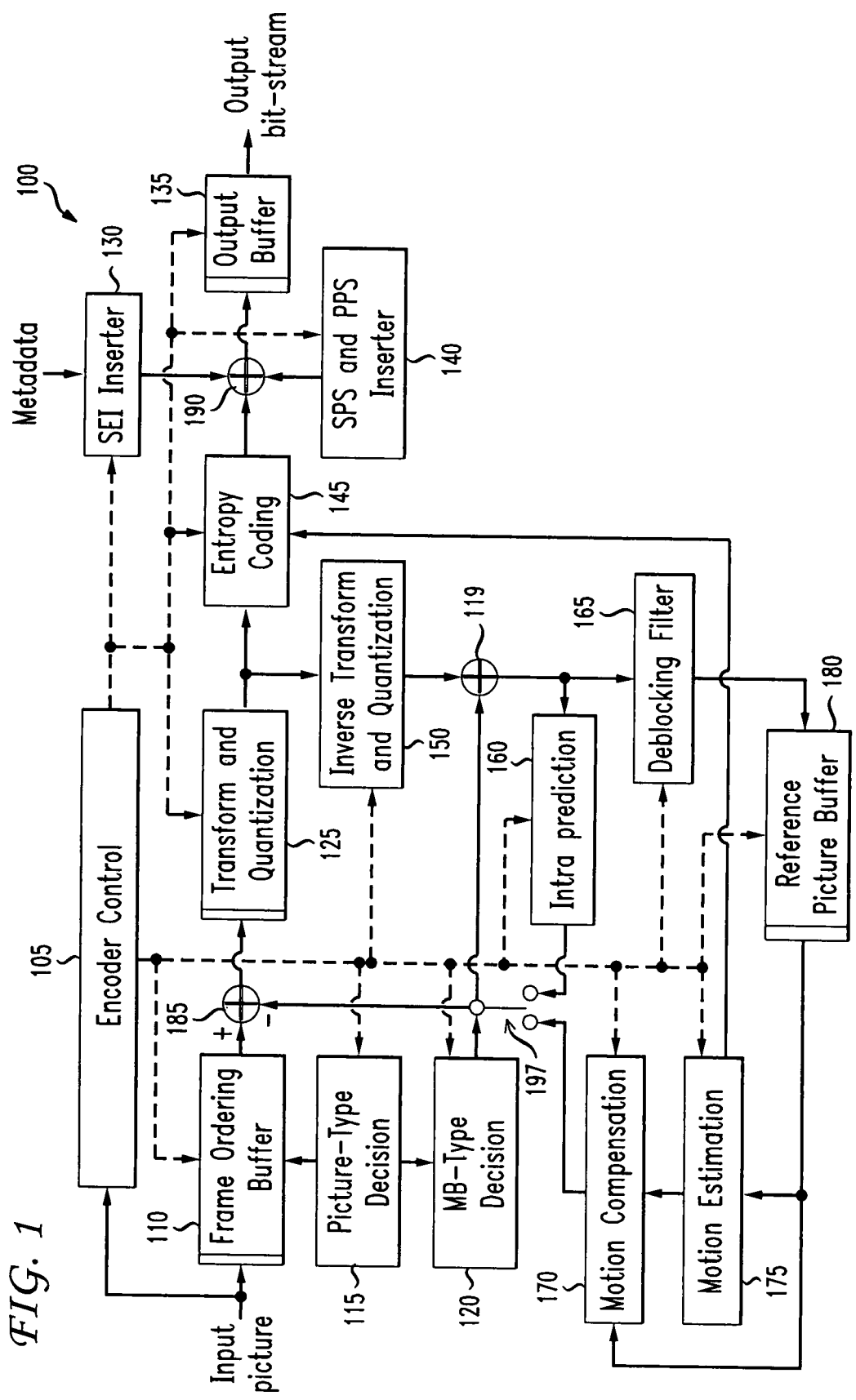
FIG. 1 is a block diagram showing an exemplary video encoder to which the present principles may be applied, in accordance with an embodiment of the present principles.

The present principles are directed to methods and apparatus for bit depth scalable video encoding and decoding utilizing tone mapping and inverse tone mapping.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, for the purposes of describing the present principles as well as the prior art, the terms low bit depth and high bit depth are used herein. These terms are used to define two different levels of bit depth definition. High bit depth is characterized in that it is at a higher bit depth than the low bit depth and, therefore, is a relative term. For purposes of discussion and illustration, a low bit depth is presumed to be 8 bits, while a high bit depth is presumed to be 10 bits. Due to the relative nature of these terms low bit depth and high bit depth, it is easily seen that the requirement here is that the low bit depth is less than the high bit depth, otherwise the terms are arbitrary. Thus, for example, the low bit depth may be 4 bit, 6 bit, or for that matter 12 bit, as the only requirement is that the high bit depth envisioned is greater than that of the low bit depth. Therefore, if it is presumed that a bit depth of 12 bits is defined as the low bit depth, then high bit depth may be considered 14 bits, 16 bits, or any other bit depth greater than 12. Here, where discussion and illustration of the present principles presumes a low bit depth is equal to 8 bits, the requirement for a high bit depth would be anything greater than 8 bits (10 bits are presumed here for the discussion, but could easily encompass a bit depth of 12 bits, 14 bits, or any other bit depth greater than 8). Another way to describe the comparison of low and high bit depth is base layer bit depth and enhanced layer bit depth, with the enhanced layer bit depth being greater than the base layer bit depth. Hence, it is to be appreciated that while one or more embodiments of the present principles involve the use of a 10-bit picture as an example for high bit depth, the present principles are not limited to the same and, thus, use of the present principles involving high bit depth can take on other values (than 10) that are greater than eight including, but not limited to, 12 bit, 14 bit, and so forth.

Further, for the sake of illustration, one or more embodiments are described herein where only bit depth scalability is involved and a single loop decoding architecture is used. However, it is to be appreciated that the present principles are not limited to the preceding and, thus, given the teachings of the present principles provided herein, may be readily extended by one of ordinary skill in this and related arts to involve combined scalability, such as bit depth and spatial scalability, and so forth, as well as multiple-loop decoding architectures, while maintaining the spirit of the present principles.

Also, as used herein, the words "picture" and "image" are used interchangeably and refer to a still image or a picture from a video sequence. As is known, a picture may be a frame or a field.

Additionally, as used herein, the word "signal" refers to indicating something to a corresponding decoder. For example, the encoder may signal a particular one of a group of tone mapping functions or inverse tone mapping functions in order to make the decoder aware of which particular function was used on the encoder side. In this way, the same function may be used at both the encoder side and the decoder side. Thus, for example, an encoder may transmit a particular mapping function to the decoder so that the decoder may use the same particular mapping function or, if the decoder already has the particular mapping function as well as others, then signaling may be used (without transmitting) to simply allow the decoder to know and select the particular mapping function. By avoiding transmission of any actual functions, a bit savings may be realized. It is to be appreciated that signaling may be accomplished in a variety of ways. For example, one or more syntax elements, flags, and so forth may be used to signal information to a corresponding decoder.

Moreover, as used herein, the phrase "same bit depth representation" refers to one or more items (e.g., predictions, residues, etc.) having a same bit depth value. For example, in the case of two or more items, such items will have the same bit depth value relative to themselves. Thus, for example, if two predictions have the same bit depth representation, then those two predictions will also have the same bit depth values. Thus, both predictions may have an 8-bit depth, or both may have a 10-bit depth, and so forth. Of course, higher and lower bit values may also be used, while maintaining the spirit of the present principles. In the case of one item, for example, a residue, that residue will have the same bit depth before and after a particular function including, but not limited to, a tone mapping function, an inverse tone mapping function, and a conversion from a residue domain to a pixel domain that involves both the tone mapping function and the inverse tone mapping function.

Turning to FIG. 1, a video encoder capable of performing video encoding in accordance with the present principles is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SD) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Figure 2:
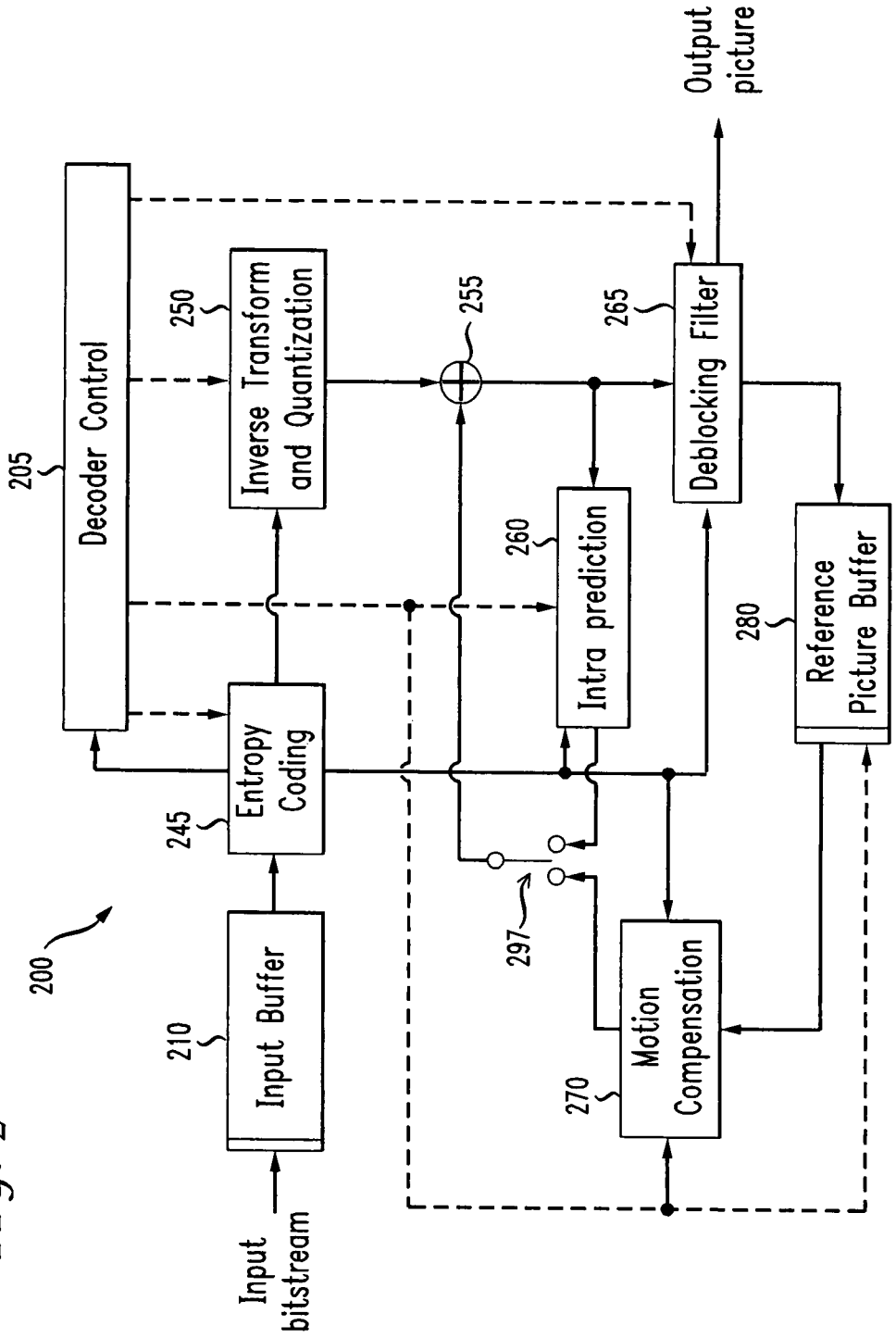
FIG. 2 is a block diagram showing an exemplary video decoder to which the present principles may be applied, in accordance with an embodiment of the present principles.

Turning to FIG. 2, a video decoder capable of performing video decoding in accordance with the present principles is indicated generally by the reference numeral 200.

The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270, a first input of the deblocking filter 265, and a third input of the intra predictor 260. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

As noted above, the present principles are directed to methods and apparatus for bit depth scalable video encoding and decoding utilizing tone mapping and inverse tone mapping. Also as noted above, with respect to the above described fourth prior art approach, the fourth prior art approach tone maps the prediction block P into the base layer bit depth and then inverse tone maps back to the enhancement layer bit depth. Since the base layer has a lower bit depth, this conversion will introduced quantization error. To prevent this quantization error of the prior art, the present principles provides methods and apparatus for tone mapping and inverse tone mapping operations performed at the same bit depth.

One way to achieve bit depth scalability within the current SVC extension of the MPEG-4 AVC Standard is to specify the decoding process of two coarse-grain scalable (CGS) SNR layers that are encoded at different bit depths. Within the current SVC CGS design, the motion compensation is performed at the highest layer (high bit depth layer). It is difficult to apply inter-layer residue prediction directly, because the bit-depth is different between the two layers. Thus, inverse tone mapping for the inter-layer residue prediction is used. However, the inverse tone mapping is usually defined in the pixel domain instead of the residue domain. We propose new techniques, such that instead of performing inverse tone mapping for inter-layer residue prediction in the residue domain, we convert the problem such that the inverse tone mapping for inter-layer residue prediction is performed in the pixel domain. This new inter-layer prediction technique has the benefit of improving coding efficiency for bit depth scalability.

Thus, the present principles use tone map and inverse tone map functions which operate on the enhancement layer bit depth. In previous prior art approaches, the tone map function maps a 10-bit input to an 8-bit output and an inverse tone map function maps an 8-bit input to 1 10-bit output. In accordance with the present principles, the tone map and inverse tone map functions map a 10-bit input to a 10-bit output. In an embodiment, the inverse tone map table is signaled in the bitstream.

A video encoding procedure in accordance with an embodiment of the present principles is as follows:

1. The prediction block P is obtained using the enhancement layer reference frames. Then P is tone mapped with function T to obtain T(P).
2. The corresponding base layer residual block $r_b$ is left shifted (or otherwise bit up-sampled) by (m−n) bits and then spatially up-sampled (if spatial scalability is to be combined with depth scalability) to obtain $U(r_b<<(m-n))$, where m is the bit depth of the enhancement layer video and n is the bit depth of the base layer video. $U(r_b<<(m-n))$ is then added to P to form $T(P)+U(r_b<<(m-n))$.
3. A filter is used to obtain $S(T(P)+U(r_b<<(m-n)))$.
4. Inverse tone mapping is then applied to obtain $T^{-1}(S(T(P)+U(r_b<<(m-n))))$.
5. The enhancement layer residual block $r_e$ is computed by subtracting a result of immediately preceding step (4) from the original block O as follows:

$$r_e=O-T^{-1}(S(T(P)+U(r_b<<(m-n)))).$$

6. The enhancement layer residual block $r_e$ is entropy-coded and signaled in the bitstream. Either T or $T^{-1}$ is signaled in the bitstream.

Figure 3:
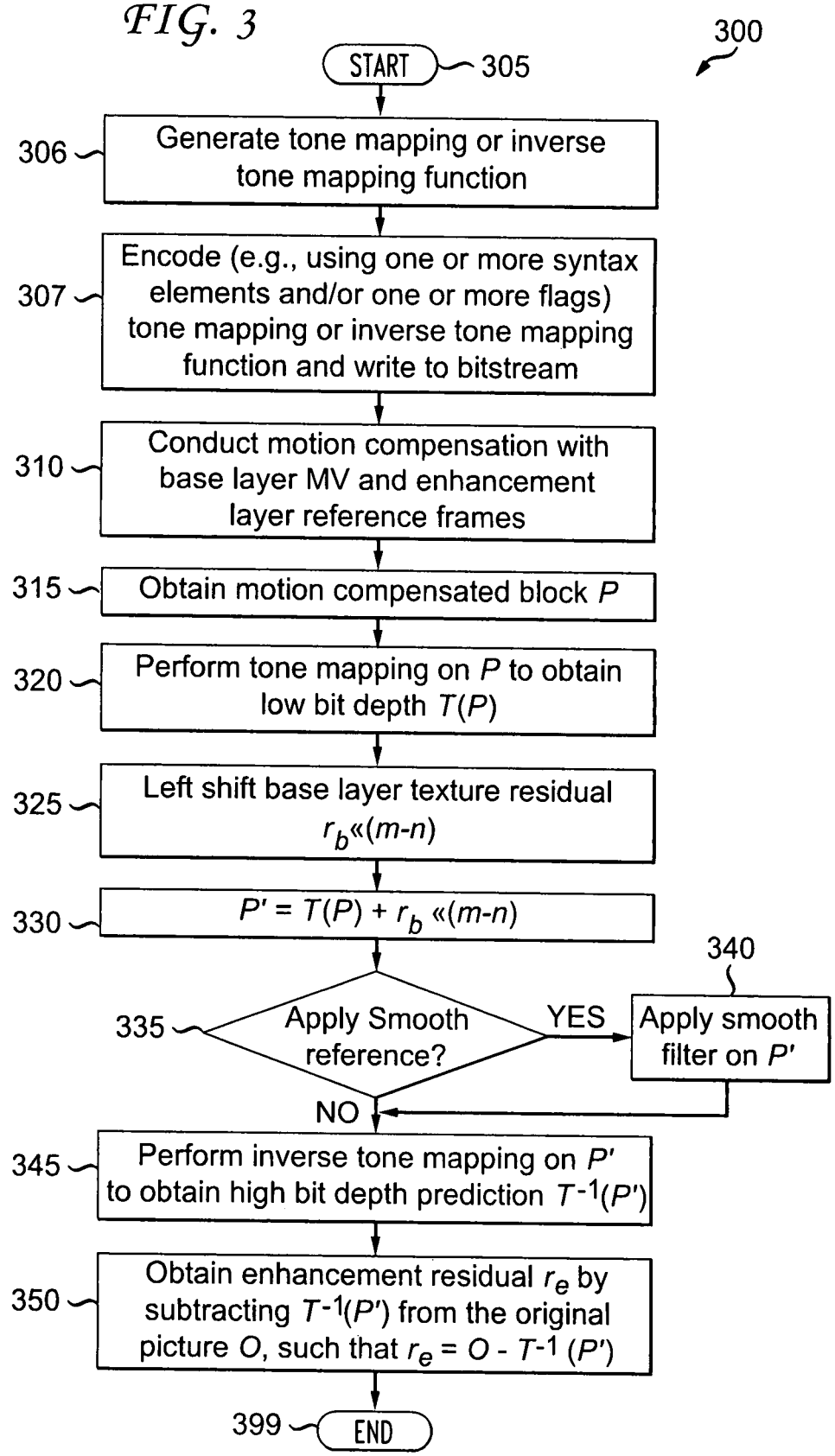
FIG. 3 is a flow diagram showing an exemplary method for inter-layer residue prediction for bit depth scalability in a video encoder, in accordance with an embodiment of the present principles.

Turning to FIG. 3, an exemplary method for inter-layer residue prediction for bit depth scalability in a video encoder is indicated generally by the reference numeral 300. The method 300 includes a start block 305 that passes control to a function block 306. The function block 306 generates a tone mapping or inverse tone mapping function, and passes control to a function block 307. The function block 307 encodes the tone mapping or inverse tone mapping function, writes the encoding to a bitstream, and passes control to a function block 310. The function block 310 conducts motion compensation with a base layer motion vector (MV) and enhancement layer reference frames, and passes control to a function block 315. The function block 315 obtains a motion compensated block P, and passes control to a function block 320. The function block 320 performs tone mapping on P to obtain a low bit depth prediction T(P), and passes control to a function block 325. The function block 325 left shifts (or otherwise bit up-samples) the base layer texture residual $r_b$ by (m−n) bits such that $r_b<<(m-n)$, and passes control to a function block 330. The function block 330 adds the left shifted base layer texture residual to T(P) to form P' such that $P'=T(P)+r_b<<(m-n)$, and passes control to a decision block 335. The decision block 335 determines whether or not to apply the smooth reference. If so, then control is passed to a function block 340. Otherwise, control is passed to a function block 345.

The function block 340 applies a smooth filter on P', and passes control to the function block 345.

The function block 345 performs inverse tone mapping on P' to obtain a high bit depth prediction $T^{-1}(P')$, and passes control to a function block 350. The function block 350 obtains the enhancement residual re by subtracting $T^{-1}(P)$ from the original picture O such that $r_e=O-T^{-1}(P')$, and passes control to an end block 399.

A video decoding procedure in accordance with an embodiment of the present principles is as follows:

1. The prediction block P is obtained using the enhancement layer reference frames. Then P is tone mapped with the function T to obtain T(P).
2. The corresponding base layer residual block $r_b$ is left shifted (or otherwise bit up-sampled) by (m−n) bits and then spatially up-sampled (if spatial scalability is to be combined with depth scalability), where m is the bit depth of the enhancement video and n is the bit depth of the base layer video. $U(r_b<<(m-n))$ is then added to P to form $$T(P)+U(r_b<<(m-n)).$$

3. A filter is used to obtain $S(T(P)+U(r_b<<(m-n)))$.
4. Inverse tone mapping is then applied to obtain $$T^{-1}(S(T(P)+U(r_b<<(m-n)))).$$

5. The enhancement layer residual block $r_e$ is added to the immediately preceding step (4) to obtain the reconstruction block $$R=T^{-1}(S(T(P)+U(r_b<<(m-n))))+r_e.$$

Turning to FIG. 4, an exemplary method for inter-layer residue prediction for bit depth scalability in a video decoder is indicated generally by the reference numeral 400. The method 400 includes a start block 405 that passes control to a function block 406. The function block 406 decodes a tone mapping or inverse tone mapping function from a bitstream, and passes control to a function block 410. The function block 410 conducts motion compensation with a base layer motion vector (MV) and enhancement layer reference frames, and passes control to a function block 415. The function block 415 obtains a motion compensated block P, and passes control to a function block 420. The function block 420 performs tone mapping on P to obtain a low bit depth prediction T(P), and passes control to a function block 425. The function block 425 left shifts (or otherwise bit upsamples) the base layer texture residual $r_b$ by (m−n) bits such that $r_b<<(m-n)$, and passes control to a function block 430. The function block 430 adds the left shifted base layer texture residual to T(P) to form P' such that $P'=T(P)+r_b<<(m-n)$, and passes control to a decision block 435. The decision block 435 determines whether or not to apply the smooth reference. If so, then control is passed to a function block 440. Otherwise, control is passed to a function block 445.

The function block 440 applies a smooth filter on P', and passes control to the function block 445. The function block 445 performs inverse tone mapping on P' to obtain a high bit depth prediction $T^{-1}(P')$, and passes control to a function block 450. The function block 450 obtains the reconstruction block R by adding $T^{-1}(P)$ to the enhancement layer residue $r_e$ such that $r_e=O-T^{-1}(P')$, and passes control to an end block 499.

We now present one exemplary embodiment of the tone map T or $T^{-1}$. The T or $T^{-1}$ can be implemented as a table with $2^m$ entries. Each entry includes from 0 to $2^m-1$.

To create T and $T^{-1}$, in an embodiment, a procedure called histogram specification is invoked as described below:

a) The base layer signal is first left shift (m−n) bits.

b) Calculate the histograms of the enhancement layer signal and the left shifted base layer signal.

c) Calculated the cumulative density function (CDF) from the enhancement layer histogram and the base layer histogram, denoted by $cdf_{e1}$, and $cdf_{b1}$, respectively.

d) To obtain T, for each bin i in the enhancement layer histogram, find the smallest bin j in the left shifted base layer histogram such that that $cdf_{b1}(j) \geq cdf_{e1}(i)$.

e) To obtain $T^{-1}$, for each bin j in the left shifted base layer histogram, find the smallest bin i in the enhancement layer histogram such that $cdf_{b1}(j) \leq cdf_{e1}(i)$.

Turning to FIG. 5, an exemplary method for creating a tone mapping function T and an inverse tone mapping function $T^{-1}$ is indicated generally by the reference numeral 500. The method includes a start block 505 that passes control to a function block 510. The function block 510 left shifts the base layer signal by (m−n) bits, where m is the bit depth of the enhancement video and n is the bit depth of the base layer video, and passes control to a function block 515. The function block 515 calculates the histograms of the enhancement layer signal and the left shifted base layer signal, and passes control to a function block 520. The function block 520 calculates the cumulative density function (CDF) from the enhancement layer histogram and the base layer histogram, denoted by $cdf_{e1}$ and $cdf_{b1}$, respectively, and passes control to a function block 525. The function block 525 obtains T for each bin i in the enhancement layer histogram by finding the smallest bin j in the left shifted base layer histogram such that $cdf_{b1}(j) \geq cdf_{e1}(i)$, and passes control to a function block 530. The function block 530 obtain $T^{-1}$ for each bin j in the left shifted base layer histogram by finding the smallest bin i in the enhancement layer histogram such that $cdf_{b1}(j) \leq cdf_{e1}(i)$, and passes control to an end block 599.

A description will now be given of some of the many attendant advantages/features of the present invention, some of which have been mentioned above. For example, one advantage/feature is an apparatus having an encoder for encoding picture data for at least a portion of a picture by generating an inter-layer residue prediction for the portion using a tone mapping function and an inverse tone mapping function. The tone mapping function and the inverse tone mapping function perform a conversion of the inter-layer residue prediction from a residue domain to a pixel domain for bit depth scalability while maintaining a same bit depth representation.

Another advantage/feature is the apparatus having the encoder as described above, wherein a quantization error caused by a bit depth reduction during the conversion is minimized by maintaining the same bit depth representation during the conversion.

Yet another advantage/feature is the apparatus having the encoder as described above, wherein the encoder generates the inter-layer residue prediction by performing motion compensation using an enhancement layer reference to generate an enhancement layer prediction, tone mapping the enhancement layer prediction to a base layer reference to generate a tone mapped prediction, bit up-sampling a base layer residue, combining the tone mapped prediction with the bit up-sampled base layer residue to obtain a sum, filtering the sum to obtain a smooth base layer reference, and inverse tone mapping the smooth base layer reference to generate an inverse tone mapped prediction. The encoder encodes and transmits an error between the inverse tone mapped prediction and the picture.

Still another advantage/feature is the apparatus having the encoder that, inter alia, encodes and transmits the error between the inverse tone mapped prediction and the picture as described above, wherein the base layer residue is bit-up-sampled by (m−n) bits, where m is a bit depth of an enhancement layer corresponding to the picture and n is a bit depth of a base layer corresponding to the picture.

Moreover, another advantage/feature is the apparatus having the encoder that, inter alia, encodes and transmits the error between the inverse tone mapped prediction and the picture as described above, wherein the encoder at least one of signals and transmits at least one of a tone mapping function used to generate the tone mapped prediction and an inverse tone mapping function used to generate the inverse tone mapped prediction.

Further, another feature is the apparatus having the encoder that at least one signals and transmits as described above, wherein the encoder signals at least one of the tone mapping function and the inverse tone mapping function using at least one of one or more syntax elements and one or more flags.

Also, another advantage/feature is the apparatus having the encoder that, inter alia, encodes and transmits the error between the inverse tone mapped prediction and the picture as described above, wherein the bit up-sampled base layer residue is spatially up-sampled to obtain a bit up-sampled spatially up-sampled base layer residue, and the bit up-sampled spatially up-sampled base layer residue is combined with the tone mapped prediction to obtain the sum.

Additionally, another advantage/feature is the apparatus having the encoder as described above, wherein the same bit depth representation is maintained by inputting and outputting values having a same bit depth with respect to both the tone mapping function and the inverse tone mapping function.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding picture data for at least a portion of a picture by generating an inter-layer residue prediction for the portion using a tone mapping function and an inverse tone mapping function,
wherein the tone mapping function and the inverse tone mapping function perform a conversion of the inter-layer residue prediction from a residue domain to a pixel domain for bit depth scalability while maintaining a same bit depth representation,
wherein said encoder generates the inter-layer residue prediction by performing motion compensation using an enhancement layer reference to generate an enhancement layer prediction, tone mapping the enhancement layer prediction to a base layer reference to generate a tone mapped prediction, bit up-sampling a base layer residue, combining the tone mapped prediction with the bit up-sampled base layer residue to obtain a sum, filtering the sum to obtain a smooth base layer reference, inverse tone mapping the smooth base layer reference to generate an inverse tone mapped prediction, and wherein said encoder encodes and transmits an error between the inverse tone mapped prediction and the picture.

2. The apparatus of claim 1, wherein a quantization error caused by a bit depth reduction during the conversion is minimized by maintaining the same bit depth representation during the conversion.

3. The apparatus of claim 1, wherein the base layer residue is bit-up-sampled by (m−n) bits, where m is a bit depth of an enhancement layer corresponding to the picture and n is a bit depth of a base layer corresponding to the picture.

4. The apparatus of claim 1, wherein said encoder at least one of signals and transmits at least one of a tone mapping function used to generate the tone mapped prediction and an inverse tone mapping function used to generate the inverse tone mapped prediction.

5. The apparatus of claim 4, wherein said encoder signals at least one of the tone mapping function and the inverse tone mapping function using at least one of one or more syntax elements and one or more flags.

6. The apparatus of claim 1, wherein the bit up-sampled base layer residue is spatially up-sampled to obtain a bit up-sampled spatially up-sampled base layer residue, and the bit up-sampled spatially up-sampled base layer residue is combined with the tone mapped prediction to obtain the sum.

7. The apparatus of claim 1, wherein the same bit depth representation is maintained by inputting and outputting values having a same bit depth with respect to both the tone mapping function and the inverse tone mapping function.

8. A method, comprising:
encoding picture data for at least a portion of a picture by generating an inter-layer residue prediction for the portion using a tone mapping function and an inverse tone mapping function,
wherein the tone mapping function and the inverse tone mapping function perform a conversion of the inter-layer residue prediction from a residue domain to a pixel domain for bit depth scalability while maintaining a same bit depth representation,
wherein generating the inter-layer residue prediction comprises:
performing motion compensation using an enhancement layer reference to generate an enhancement layer prediction, tone mapping the enhancement layer prediction to a base layer reference to generate a tone mapped prediction, bit up-sampling a base layer residue, combining the tone mapped prediction with the bit up-sampled base layer residue to obtain a sum, filtering the sum to obtain a smooth base layer reference, inverse tone mapping the smooth base layer reference to generate an inverse tone mapped prediction, and wherein the method further comprises encoding and transmitting an error between the inverse tone mapped prediction and the picture.

9. The method of claim 8, wherein a quantization error caused by a bit depth reduction during the conversion is minimized by maintaining the same bit depth representation during the conversion.

10. The method of claim 8, wherein the base layer residue is bit up-sampled by (m−n) bits, where m is a bit depth of an enhancement layer corresponding to the picture and n is a bit depth of a base layer corresponding to the picture.

11. The method of claim 8, wherein the method further comprises at least one of signaling and transmitting at least one of a tone mapping function used to generate the tone mapped prediction and an inverse tone mapping function used to generate the inverse tone mapped prediction.

12. The method of claim 11, wherein said encoder signals at least one of the tone mapping function and the inverse tone mapping function using at least one of one or more syntax elements and one or more flags.

13. The method of claim 8, wherein the bit up-sampled base layer residue is spatially up-sampled to obtain a bit up-sampled spatially up-sampled base layer residue, and the bit up-sampled spatially up-sampled base layer residue is combined with the tone mapped prediction to obtain the sum.

14. The method of claim 8, wherein the same bit depth representation is maintained by inputting and outputting values having a same bit depth with respect to both the tone mapping function and the inverse tone mapping function.

15. An apparatus, comprising:
a decoder for decoding picture data for at least a portion of a picture by generating an inter-layer residue prediction for the portion using a tone mapping function and an inverse tone mapping function,
wherein the tone mapping function and the inverse tone mapping function perform a conversion of the inter-layer residue prediction from a residue domain to a pixel domain for bit depth scalability while maintaining a same bit depth representation,
wherein said decoder generates the inter-layer residue prediction by performing motion compensation using an enhancement layer reference to generate an enhancement layer prediction, tone mapping the enhancement layer prediction to a base layer reference to generate a tone mapped prediction, bit up-sampling a base layer residue, combining the tone mapped prediction with the bit up-sampled base layer residue to obtain a sum, filtering the sum to obtain a smooth base layer reference, inverse tone mapping the smooth base layer reference to generate an inverse tone mapped prediction, and wherein said decoder generates a reconstructed version of the portion based upon an error between the inverse tone mapped prediction and the picture.

16. The apparatus of claim 15, wherein a quantization error caused by a bit depth reduction during the conversion is minimized by maintaining the same bit depth representation during the conversion.

17. The apparatus of claim 15, wherein the base layer residue is bit up-sampled by (m−n) bits, where m is a bit depth of an enhancement layer corresponding to the picture and n is a bit depth of a base layer corresponding to the picture.

18. The apparatus of claim 15, wherein said decoder at least one of decodes and determines at least one of a tone mapping function used to generate the tone mapped prediction and an inverse tone mapping function used to generate the inverse tone mapped prediction.

19. The apparatus of claim 18, wherein said decoder determines at least one of the tone mapping function and the inverse tone mapping function from at least one of one or more syntax elements and one or more flags.

20. The apparatus of claim 15, wherein the bit up-sampled base layer residue is spatially up-sampled to obtain a base up-sampled spatially up-sampled base layer residue, and the base up-sampled spatially up-sampled base layer residue is combined with the tone mapped prediction to obtain the sum.

21. The apparatus of claim 15, wherein the same bit depth representation is maintained by inputting and outputting values having a same bit depth with respect to both the tone mapping function and the inverse tone mapping function.

22. A method, comprising:
decoding picture data for at least a portion of a picture by generating an inter-layer residue prediction for the portion using a tone mapping function and an inverse tone mapping function,
wherein the tone mapping function and the inverse tone mapping function perform a conversion of the inter-layer residue prediction from a residue domain to a pixel domain for bit depth scalability while maintaining a same bit depth representation,
wherein generating the inter-layer residue prediction comprises:
performing motion compensation using an enhancement layer reference to generate an enhancement layer prediction;
tone mapping the enhancement layer prediction to a base layer reference to generate a tone mapped prediction;
bit up-sampling a base layer residue;
combining the tone mapped prediction with the bit up-sampled base layer residue to obtain a sum; and
filtering the sum to obtain a smooth base layer reference, inverse tone mapping the smooth base layer reference to generate an inverse tone mapped prediction,
wherein the method further comprises generating a reconstructed version of the portion based upon an error between the inverse tone mapped prediction and the picture.

23. The method of claim 22, wherein a quantization error caused by a bit depth reduction during the conversion is minimized by maintaining the same bit depth representation during the conversion.

24. The method of claim 22, wherein the base layer residue is bit up-sampled by (m−n) bits, where m is a bit depth of an enhancement layer corresponding to the picture and n is a bit depth of a base layer corresponding to the picture.

25. The method of claim 22, wherein the method further comprises at least one of decoding and determining at least one of a tone mapping function used to generate the tone mapped prediction and an inverse tone mapping function used to generate the inverse tone mapped prediction.

26. The method of claim 25, wherein said decoder determines at least one of the tone mapping function and the inverse tone mapping function from at least one of one or more syntax elements and one or more flags.

27. The method of claim 22, wherein the bit up-sampled base layer residue is spatially up-sampled to obtain a bit up-sampled spatially up-sampled base layer residue, and the bit up-sampled spatially up-sampled base layer residue is combined with the tone mapped prediction to obtain the sum.

28. The method of claim 22, wherein the same bit depth representation is maintained by inputting and outputting values having a same bit depth with respect to both the tone mapping function and the inverse tone mapping function.

29. A non-transitory computer readable storage media having video signal data encoded thereupon, comprising:
picture data for at least a portion of a picture encoded by generating an inter-layer residue prediction for the portion using a tone mapping function and an inverse tone mapping function,
wherein the tone mapping function and the inverse tone mapping function perform a conversion of the inter-layer residue prediction from a residue domain to a pixel domain for bit depth scalability while maintaining a same bit depth representation,
wherein generating the inter-layer residue prediction comprises performing motion compensation using an enhancement layer reference to generate an enhancement layer prediction, tone mapping the enhancement layer prediction to a base layer reference to generate a tone mapped prediction, bit up-sampling a base layer residue, combining the tone mapped prediction with the bit up-sampled base layer residue to obtain a sum, filtering the sum to obtain a smooth base layer reference, inverse tone mapping the smooth base layer reference to generate an inverse tone mapped prediction, and wherein said storage media video signal data further comprises an encoded error between the inverse tone mapped prediction and the picture.

* * * * *